Jan. 17, 1950   P. G. HANSEL   2,494,553
DIRECTION FINDING SYSTEM
Filed Oct. 16, 1945
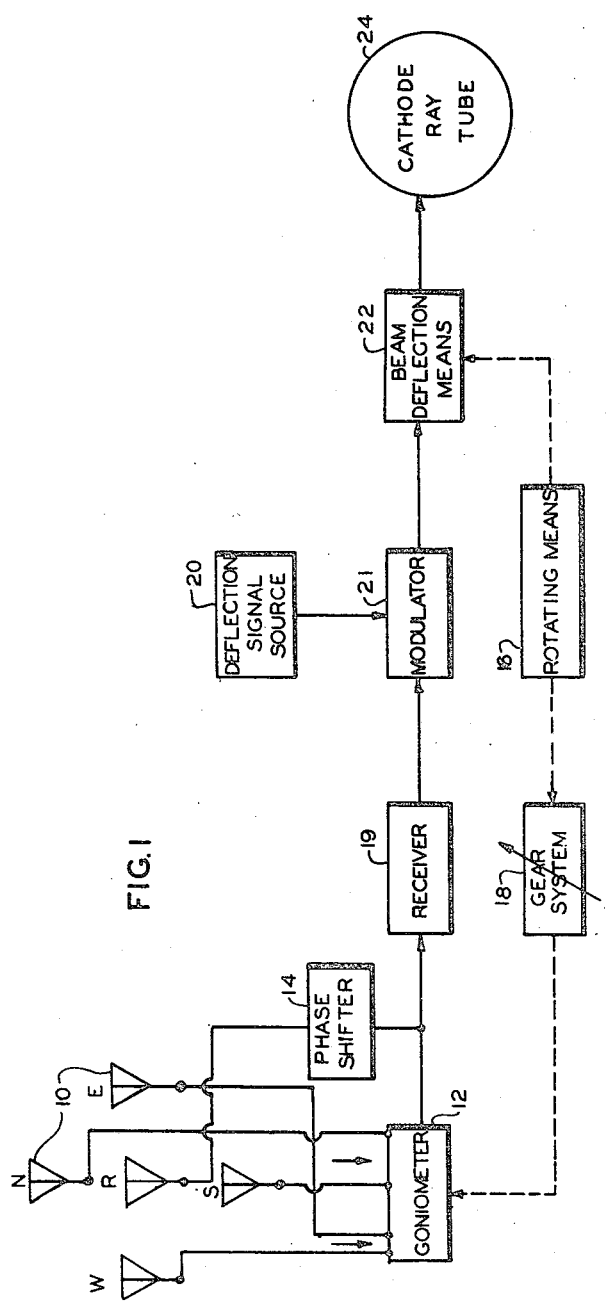
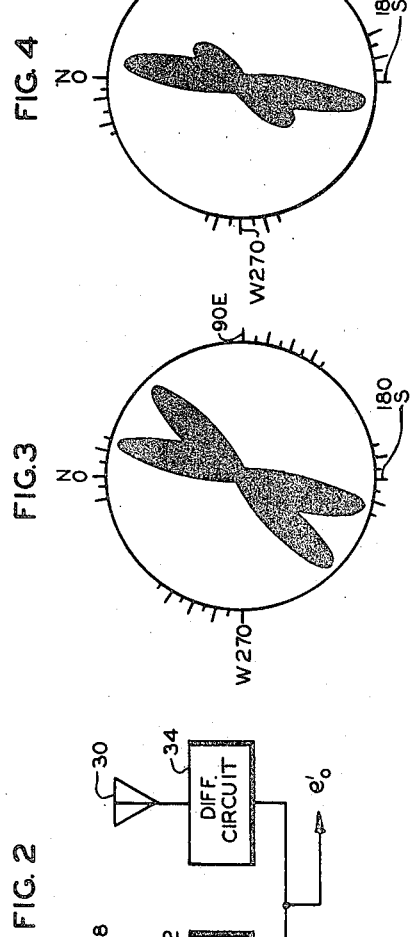
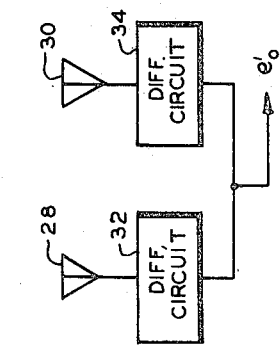
*INVENTOR.*
PAUL G. HANSEL
BY
*William D. Hall*
*Attorney*

Patented Jan. 17, 1950

2,494,553

UNITED STATES PATENT OFFICE 2,494,553

DIRECTION FINDING SYSTEM

Paul G. Hansel, Red Bank, N. J.

Application October 16, 1945, Serial No. 622,644

18 Claims. (Cl. 343—118)

(Granted under the act of March 3, 1883, as amended April 30, 1928; 370 O. G. 757)

The invention described herein may be manufactured and used by or for the Government for governmental purposes, without the payment to me of any royalty thereon.

This invention pertains to radio direction finding systems and has particular applicability to those of the direct reading type.

The invention is generally applicable to direction finding systems wherein a directional antenna system is actually, or in effect, continuously rotated to produce a directionally-characterized signal whose modulation phase is a function of the direct and reciprocal directions of wave arrival.

An important object of this invention is to provide a convenient method whereby both the signal sensitivity and the observational accuracy of a direction finder may be enhanced.

A further object is to provide direction finding systems of extremely high observational accuracy for operation over limited azimuthal sectors.

Another object is to provide a direction finding method whereby accurate bearing observations may be obtained under difficult conditions such as those imposed by rapidly-varying space-diversity effects and multiple-ray reception.

For a better understanding of the invention together with other and further objects thereof, reference is had to the following description taken in conjunction with the accompanying drawing, wherein:

Figure 1 is a block diagram of one embodiment of this invention;

Figure 2 is a schematic circuit diagram of a spaced-aerial arrangement for deriving a reference signal which is not directionally characterized to a significant degree;

Figure 3 shows a typical double propeller indicating display; and

Figure 4 shows the unsymmetrical form of indicating display obtained under conditions unfavorable for direction finding.

Referring particularly to Fig. 1, a conventional direction finding antenna system 10, which comprises the spaced aerials N, E, S, and W arranged at the corners of a square, is coupled to a goniometer 12. The latter is continuously driven through a gear system 18 by a rotator 16, which may be a motor. The goniometer output is impressed upon a receiver 19.

As is well known the signal $e_d$ obtained from the goniometer is of the form:

$$e_d = k_1 \cos(\alpha - \omega_r t) \cos \omega_c t \qquad (1)$$

where $k_1$ is a constant,
  $\alpha$ is the direction of wave arrival,
  $\omega_c$ is the angular frequency of the received signal, and
  $\omega_r$ is the angular velocity of the goniometer rotation.

This is a carrier-suppressed signal which is directionally characterized in that the direct and reciprocal directions of arrival are implicit in its envelope phase. A substantially identical signal might be obtained by spinning a single vertical loop antenna about a vertical axis.

A reference antenna R is connected to the receiver input through a phase-shifter 14 to provide a carrier signal $e_0$ which is not directionally characterized and which is of the form:

$$e_0 = k_0 \cos \omega_c t \qquad (2)$$

Such a signal is commonly employed in conventional systems for sense-finding purposes. In this invention the carrier signal $e_0$, expressed by Equation 2, although it may be used for sense finding, also serves another purpose, namely to distort the envelope symmetry of the directionally-characterized signal $e_d$ without regard to the sense or direction of the distortion.

The amplitude of the carrier signal $e_0$ is made less than the maximum amplitude of the directionally-characterized signal $e_d$ so that the envelope of the resultant signal $(e_d + e_0)$, which is impressed upon receiver 19, is a degenerate cardioid when plotted in polar coordinates.

The output of receiver 19 is a pulsating signal having "nulls" or minima which are unsymmetrically displaced in time. This output is impressed upon a modulator 21 to modulate, preferably negatively, a moderately high-frequency signal derived from a deflection signal source 20, which may be a sine wave oscillator. The modulated output of modulator 21 is impressed upon the beam deflecting means 22 associated with a cathode ray tube 24 to produce a diametral line trace, the length of which is controlled by the output of receiver 19. The beam deflection means 22 may take the form of a rotatable deflection coil.

Rotator 16 is coupled to the beam deflection means 22 to produce rotation of the diametral line trace at an angular velocity equal to an integral or fractional multiple of the angular velocity of the goniometer rotation, depending upon the input-output gear ratio of the gear system 18 interposed between the rotator and the goniometer.

The resultant pattern which appears on the screen of the cathode ray tube 24 will be of the form shown in Fig. 3. Under favorable conditions this pattern will consist of two identical propellers whose angular displacement depends upon the ratio of the carrier signal $e_0$ to the carrier-suppressed signal $e_d$. The intersection of the two angularly-displaced propellers represents the bearing and can be read with the aid of an alidade to a much higher degree of precision that can the angular position of a single propeller. This is an advantage which is particularly important when the received signal is so weak that the tips of the propellers are obscured by noise traces. It has been found in practice that the most favorable ratio of $e_o$ to $e_d$ is about 0.5 although a ratio up to unity might be used.

This method of producing a split presentation is superior to the manual splitting method disclosed in my co-pending application, entitled "Receiving apparatus," Serial No. 541,950, filed June 24, 1944, issued on July 26, 1949 as Patent No. 2,476,977, because it requires no manipulation of controls on the bearing indicator and because, in addition, it increases the actual amount of signal received, thereby enhancing the signal sensitivity as well as the observational accuracy.

As workers in the field of short-wave direction finding are aware, many signals encountered in practice exhibit violent and almost continuous fluctuations in the apparent direction of arrival. Under these conditions accurate reading of bearings is practically impossible with conventional direction finders. Through the use of this invention, however, bearings can usually be obtained under such conditions with a high degree of accuracy. The reason for this is that the symmetrically-split pattern shown in Fig. 3 is produced only when the phase relation between the directionally-characterized signal $e_d$ and the carrier signal $e_o$ is in accord with Equations 1 and 2. When, for example, space-diversity effects produce severe wavefront distortion, an unsymmetrically-split pattern such as that shown in Fig. 4 will be produced. The operator is thereby warned that the bearing is unreliable and he can then wait until the pattern becomes symmetrical before recording a bearing observation. The symmetry characteristics of the pattern thus provide a convenient criterion for distinguishing between favorable and unfavorable times for recording a bearing. Even better performance in this regard can be obtained by eliminating the reference antenna R and the phase shifter 14 and utilizing as the required carrier signal $e_o$ the differentiated outputs of any even number of spaced aerials. This can be accomplished in the manner shown in Fig. 2. The spaced aerials 28 and 30, which may be two of the aerials N, S, E, and W, are connected to differentiating circuits 32 and 34 respectively. The resulting differentiated signals are combined to produce a carrier signal $e_o$ which may be impressed upon the input of receiver 14 in place of the phase-shifted output of a single reference antenna as previously shown in Fig. 1. Since the phase of a signal resulting from the combination of an even number of signals derived from spaced aerials is critically dependent upon the relative amplitudes of the component signals, wavefront distortion will result in extremely pronounced lack of pattern symmetry.

Direction finding applications exist which require an observational accuracy or repeatability of, for example, $\frac{1}{10}$-degree. Usually in such applications operation is required over only a limited azimuthal range. The observational accuracy obtainable with most conventional direction finders is only in the order of one degree. As previously stated, one of the objects of the present invention is to provide direction finding systems of extremely high observational accuracy. This is accomplished in the following manner: As shown in Fig. 1, a gear system 18 is connected between the rotator 16 and the goniometer 12. By employing a step-down ratio of, for example, 10 to 1, it is possible to rotate the beam deflection means 22 at an angular velocity of ten times the angular velocity of the goniometer. Thus the azimuth scale of the cathode-ray tube 24 is expanded so that the full 360 mechanical degrees actually represent only 36 degrees of azimuth. Each degree marker on the scale will then represent only $\frac{1}{10}$-degree. With the conventional single propeller presentation, expansion of the scale also results in such severe blunting of the propeller tips that the effective improvement in observational accuracy is much less than the scale expansion factor. On the other hand, with the split-propeller presentation provided by this invention, it is possible to realize the full improvement in observational accuracy corresponding to the scale expansion factor.

Scale expansion results in sectoral ambiguity which can be resolved by making the ratio of the gear system 18 variable. For example, a gear ratio of 1 to 1 could be employed to determine the sector and then a ratio of 10 to 1 could be employed to permit high-precision observation of bearing. The gear system 18 is shown adjustable for this purpose.

This invention is readily applicable to direction finders of the type disclosed in my co-pending application above cited, the disclosure of which is hereby made a part of this application. For this purpose, switches 51, 52, 53, and 54 shown in Figs. 1 and 8 of said application, should be closed. The four resistors 80 shown in said Fig. 8 should be adjusted to provide a ratio of $e_o$ to $e_d$ of about 0.5. The blanking switch shown in Fig. 2 of said application should be open. The above-described method for applying the present invention to the direction finder shown in said co-pending application is also disclosed in "Electronics," April 1948, pages 86–91.

Scale expansion can be readily applied to the direction finder of said application by interposing a frequency multiplier, which is preferably variable to provide any desired degree of multiplication, between the phase rotation control 40 and the amplifier and filter 41 shown in Fig. 2 of said application.

While there has been described what is at present considered a preferred embodiment of the invention, it will be obvious to those skilled in the art that various changes and modifications may be made therein without departing from the invention, and it is aimed in the appended claims to cover all such changes and modifications as fall within the true spirit and scope of the invention.

I claim:

1. A direction finding system comprising: an antenna system with associated effective rotating means for deriving from a single incoming wave a directionally-characterized signal whose modulation phase is a function of the direct and reciprocal directions of wave arrival; means for deriving from said wave a carrier signal; continuously receptive means for combining said first-named signal with said carrier signal to obtain a resultant directionally-characterized signal having envelope minima unsymmetrically displaced in time; a radio receiver to which said resultant signal is applied; and indicating means receptive of the output of said receiver for producing intersecting indicia having an angular displacement proportional to the relative magnitudes of said carrier signal and said first-named signal.

2. A system as set forth in claim 1, wherein said means for deriving a carrier signal is a non-directional antenna means.

3. A direction finding system comprising:

means including an antenna system for obtaining from a single incoming wave a first signal and a second signal of the forms $k_1 \cos(\alpha - \omega_r t) \cos \omega_c t$ and $k_0 \cos \omega_c t$ respectively, in which $k_1$ and $k_0$ are constants, $\alpha$ is the direction of the arrival of said incoming wave at said antenna, $\omega_c$ is angular frequency of said incoming wave, and $t$ is time; a receiver continuously receptive of said first and second signals; a cathode ray tube; means for deflecting the beam of said cathode ray tube to produce a diametral line trace; means for rotating said diametral line trace at an angular velocity of $\omega_r$ and means for controlling the instantaneous length of said trace in accordance with the output of said receiver to produce a pair of intersecting propeller-shaped indicia having an angular displacement proportional to the relative magnitudes of said first and second signals.

4. A direction finding system according to claim 1, wherein said means for deriving from said wave a carrier signal comprises an even number of spaced antennas.

5. A direction finding system according to claim 3, wherein said diametral line trace is rotated at an angular velocity equal to an integral multiple of $\omega_r$.

6. A direction finding system according to claim 3, wherein said second signal is derived from an even number of spaced antennas.

7. A direction finding system according to claim 3, wherein said second signal is derived from an even number of spaced aerials and wherein said diametral line trace is rotated at an angular velocity equal to an integral multiple of $\omega_r$.

8. A direction finding system as set forth in claim 3, wherein the means for obtaining said second signal comprises an even number of spaced antennas, means for separately differentiating the output of each of said antennas, and means to combine the differentiated outputs.

9. A direction finding system for radio waves comprising: antenna means to derive from a single incoming wave a pair of signals, one signal being independent of the bearing of said incoming wave, the other signal having a modulation superimposed thereon, the phase of said modulation being dependent upon said bearing but having 180° ambiguity therein, means for combining said signals to derive a resultant modulated signal having a modulation phase which is dependent upon said bearing and has 180° ambiguity therein, said resultant signal having a plurality of minima unsymmetrically displaced in time, and indicating means continuously responsive to said resultant signal for producing intersecting indicia having an angular displacement dependent upon the relative magnitudes of said pair of signals.

10. A direction finding system comprising: directional antenna means, means for producing a rotation of the effective direction of said antenna means, means responsive to said rotation for deriving from an incoming wave of modulated signal, the modulation phase of said signal being dependent upon the bearing of said wave but having 180° ambiguity therein, means for deriving from said incoming wave a second signal which is independent of said bearing, means for combining said signals to derive a resultant modulated signal having a modulation phase which is dependent upon said bearing and having a plurality of minima unsymmetrically displaced in time, a cathode ray tube, means for deflecting the beam of said tube to produce a diametral line trace, means synchronized with said rotation for rotating said diametral line trace, and means for controlling the instantaneous length of said trace in accordance with the instantaneous amplitude of said resultant signal.

11. A direction finding system as set forth in claim 10, wherein said instantaneous length is inversely proportional to said instantaneous amplitude.

12. A direction finding system as set forth in claim 10, wherein said diametral line trace is rotated at an angular velocity which is equal to an integral multiple of the angular velocity of said rotation.

13. A direction finding system as set forth in claim 10, wherein said second signal is derived from an even number of spaced antennas.

14. A direction finding system as set forth in claim 13, wherein said spaced antennas constitute part of said directional antenna means.

15. A direction finding system as set forth in claim 10, wherein the means for deriving said second signal comprises an even number of spaced antennas, means for separate differentiating the output of each of said antennas, and means to combine the differentiated outputs.

16. A direction finding system comprising a directional means for deriving from an incoming wave a signal having a fixed angular frequency and a direction-dependent phase, a phase meter having periodically movable indication producing means responsive to said signal to indicate said phase, the frequency of said periodically movable means being an integral multiple of said angular frequency.

17. A direction finding system comprising a directional means for deriving from an incoming wave a signal having a fixed angular frequency and a direction-dependent phase, a phase meter having rotatable indication producing means responsive to said signals to indicate said phase, the angular frequency of said rotatable means being an integral multiple of said fixed angular frequency.

18. A system according to claim 17, including means for altering said multiple.

PAUL G. HANSEL.

REFERENCES CITED

The following references are of record in the file of this patent:

UNITED STATES PATENTS

| Number | Name | Date |
| --- | --- | --- |
| 1,908,006 | Belline | May 9, 1933 |
| 2,213,273 | Earp | Sept. 3, 1940 |
| 2,238,129 | Paul | Apr. 15, 1941 |
| 2,263,377 | Busignies | Nov. 18, 1941 |
| 2,297,414 | Janovsky | Sept. 29, 1942 |
| 2,314,093 | Landon | Mar. 16, 1943 |
| 2,380,929 | Ahier et al. | Aug. 7, 1945 |
| 2,388,262 | Ganiayre | Nov. 6, 1945 |
| 2,403,727 | Loughren | July 9, 1946 |
| 2,403,967 | Busignies | July 16, 1946 |
| 2,405,203 | Goldstein | Aug. 6, 1946 |
| 2,407,281 | Johnson et al. | Sept. 10, 1946 |

Certificate of Correction

Patent No. 2,494,553 January 17, 1950

PAUL G. HANSEL

It is hereby certified that error appears in the printed specification of the above numbered patent requiring correction as follows:

Column 5, line 64, for the words "wave of" read *wave a*;

and that the said Letters Patent should be read with this correction therein that the same may conform to the record of the case in the Patent Office.

Signed and sealed this 2nd day of May, A. D. 1950.

[SEAL]

THOMAS F. MURPHY,
*Assistant Commissioner of Patents.*